(12) United States Patent
Annis

(10) Patent No.: US 7,012,987 B1
(45) Date of Patent: Mar. 14, 2006

(54) METHOD FOR PREVENTING HIGHER DENSITY REGIONS OF AN OBJECT FROM DEGRADING THE LOWER DENSITY FOCUSED REGIONS OF A LAMINOGRAPHY IMAGE

(76) Inventor: Martin Annis, 66 Church St., Cambridge, MA (US) 02138

( * ) Notice: Subject to any disclaimer, the term of this patent is extended or adjusted under 35 U.S.C. 154(b) by 0 days.

(21) Appl. No.: 11/039,460

(22) Filed: Jan. 19, 2005

Related U.S. Application Data

(60) Provisional application No. 60/538,041, filed on Jan. 20, 2004.

(51) Int. Cl.
*G01N 23/04* (2006.01)
(52) U.S. Cl. .......................................... 378/57; 378/21
(58) Field of Classification Search .................. 378/12, 378/21–27, 28, 57, 62, 10
See application file for complete search history.

(56) References Cited

U.S. PATENT DOCUMENTS 6,236,709 B1 * 5/2001 Perry et al. .................... 378/57

6,628,745 B1 * 9/2003 Annis et al. .................. 378/21

* cited by examiner

*Primary Examiner*—David V. Bruce
*Assistant Examiner*—Hoon Song
(74) *Attorney, Agent, or Firm*—Altman & Martin

(57) ABSTRACT

A method for substantially reducing the contribution of dense regions of an object while less dense regions of the object are being processed in a laminography blurring system. The method comprises the steps of positioning an x-ray source with a moving fan beam on one side of the object; positioning a row of x-ray detectors on the side of the object opposite that of the x-ray source; sequentially emitting a plurality of x-ray fan beams along an x-ray source line and directed through a focused pixel of the object to the row of x-ray detectors; sampling the x-ray detectors once for each of the fan beams for a total of it samples of intensity $I_i$; determining the maximum intensity $I_{max}$ from the samples $I_i$; choosing a parameter P greater than one; retaining only those samples $I_i$ that are greater than or equal to $I_{max}/P$; summing the retained samples; and normalizing the resultant sum. Normalizing can include multiplying the sum by the total number of samples divided by the number of retained samples.

3 Claims, 3 Drawing Sheets

- Prior Art -

METHOD FOR PREVENTING HIGHER DENSITY REGIONS OF AN OBJECT FROM DEGRADING THE LOWER DENSITY FOCUSED REGIONS OF A LAMINOGRAPHY IMAGE

CROSS-REFERENCES TO RELATED APPLICATIONS

The applicant wishes to claim the benefit of U.S. Provisional Patent Application No. 60/538,041, dated Jan. 20, 2004 for A NEW ALGORITHM FOR LAMINOGRAPHY: A METHOD TO AVOID THE PROBLEM OF THE DENSE OBJECT(S) BLURRING OUT LESS DENSE OBJECTS in the names of Martin Annis and Richard Adler.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to laminography, more particularly to a method for minimizing the interference caused by dense objects or portions thereof while less dense objects are being processed.

2. Description of the Related Art

U.S. Pat. No. 6,628,745, issued to the applicants hereof, discloses a method of producing Laminography (planar) images using a rapidly moving fan beam x-ray source and a U-shaped array of detectors. The apparatus described therein is shown in the FIG. 1 and described below.

The prior state-of-the-art Laminography algorithms simply add up the intensities of the beams of x-rays from the source of the traveling fan beam 12, for each successive location of the source, that intersects the source 14, the pixel to be focused 16 and the detector 18 being sampled. Two typical rays that meet this criterion are shown in FIG. 1 as AA' and BB'. These rays correspond to different positions of the x-ray fan beam 12 as it moves transversely across the bottom of the tunnel 20. This transverse passage must occur while the object moves a very small distance longitudinally through the plane of the row of detectors and the x-ray source line 10. This algorithm results in "focusing" the desired pixel while blurring all other regions in the volume being inspected.

This algorithm works successfully to produce focused pixels and/or lines (and then planes as the object moves along the conveyor) parallel to the x-ray source line. However, the blurred or unfocussed component of the resultant image can obscure the desired row of pixels if the blurring is caused by a relatively dense object in a blurred portion of the image that extends for a substantial length in the image parallel to the source/detector line. This effect can be caused, for example by the presence of a laptop computer in a carry-on bag being inspected at an airport, causing heavy blurring throughout the image. Another example occurs in medical imaging where it may be desired to inspect the lungs or the heart. In this case, the ribs that are relatively dense and generally parallel to the detector line can cause blurring that can reduce the visibility of the lungs or the heart.

BRIEF SUMMARY OF THE INVENTION

A primary object of the present invention is to greatly reduce the general intensity of the background blurring characteristic of the existing Laminography algorithms.

Another object is to substantially eliminate the background blurring caused by a high-density object outside of the plane in which the focused pixel resides.

Yet another object is to substantially eliminate the background blurring caused by a large object located outside of the plane in which the focused pixel resides.

A further object of the invention is to eliminate the above-described blurring without requiring significant additional complexity in implementing the Laminography algorithm.

A further object of the invention is to eliminate the above-described blurring without introducing any distortion of the x-ray image, as would be the case for nearly all post-processing techniques.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

The present invention is a modification of the standard blurring algorithm that substantially reduces the effect of high-density regions of an object being imaged. Each detector of a Laminography system is sampled in the standard way to accumulate i samples of intensity $I_i$ for each focused pixel, the total number being it. There will be a maximum intensity $I_{max}$ that corresponds to the particular ray that passes through the focused pixel and the minimum total density of other material in the object. A parameter P>1 is applied so as to retain for the Laminography summation only those samples whose intensity is greater than or equal to $I_{max}/P$. The number of retained samples is $i_{inc}$. A preferred value for the parameter P is in the range of about 1.01 to 2. After application of the parameter P to the values $I_i$, the samples that are not eliminated are summed in the standard laminography algorithm. The sum $\Sigma_{inc}$ is then multiplied by $i_t/i_{inc}$ in order to compensate for the omission of the intensity of the deleted rays and to normalize the result for all pixels in the image.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF THE INVENTION

The present invention uses the same primary data set as the standard blurring Laminography algorithm with an important improvement that essentially deletes the contribution of the dense portions of the image while the less dense portions of the image are being produced. This new modification is a significant improvement over the prior art systems.

Figure 1:
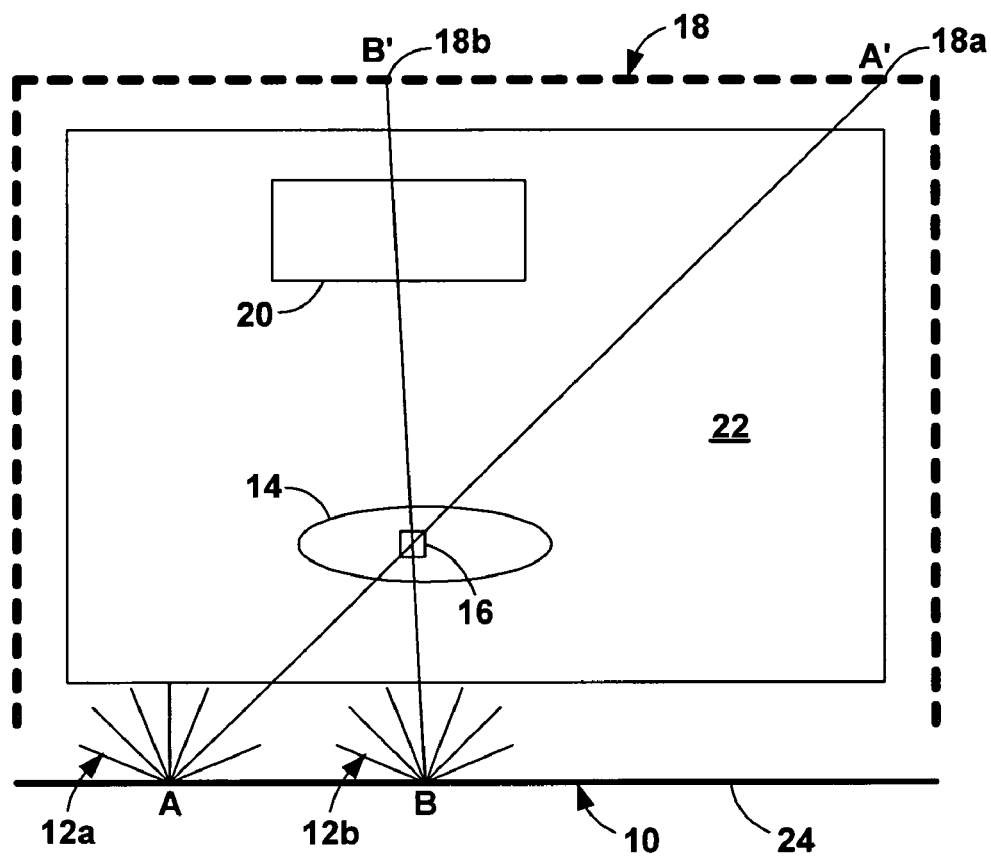
FIG. 1 shows a schematic of a prior art apparatus to produce Laminography (planar) images using a rapidly moving fan beam x-ray source and a U-Shaped array of detectors. The above method of employing the apparatus is not limited to a rapidly moving x-ray source as long as the transverse motion is very much faster than the longitudinal motion of the object through the system.

First, a brief description of how a conventional prior art Laminography algorithm works is presented. Referring to FIG. 1, consider first that an x-ray fan beam 12A is emitted from position A of the x-ray source line 24. Out of the entire fan beam 12A, only ray AA' penetrates the "focused" pixel 16 in a less dense region 14 and the corresponding detector 18A. The detector 18A is sampled at the instant of time when the x-ray fan beam is at the position A, and similarly for every position of the x-ray fan beam along the x-ray source line 24. All of these samples are summed to produce a "focused" pixel. Since this procedure is used for every position of the x-ray fan beam along the x-ray source line 24, rays such as BB' that go through the "focused" pixel 16 and a more dense region 20, are also included in the summation by the prior art algorithms.

Figure 2:
FIG. 2 is a Laminography image produced by a previous state-of-the-art algorithm.

The present invention modifies the above-described algorithm in the following crucial way in order to delete rays such as BB' that penetrate the more dense regions of the object 22 while also penetrating the focused pixel 16. These rays do not contribute useful data to the summation, but they do introduce substantial blurring throughout the image, as shown in FIG. 2, an x-ray image of a carry-on bag containing a laptop, clothing and other miscellaneous material.

For the present method, each of the detectors 18 is sampled in the standard way to produce a Laminography data set as described above. This data set includes the measured x-ray intensity $I_i$ for each of the i samples taken at the appropriate time. The total number of samples is denoted as it. The intensity corresponding to each position xi along the x-ray source line 12 $I_i = I(x_i)$ will vary from a minimum reading to a maximum reading. The maximum intensity $I_{max}$ corresponds to the particular ray that passes through the focused pixel 16 and the minimum total density of other material in the object 22 (for example, ray AA' in FIG. 1). The minimum intensity $I_{min}$ corresponds to the ray that passes through the focused pixel 16 and the maximum total density of other material in the object 22 (for example, ray BB' in FIG. 1). In frequent cases, the maximum/minimum intensity ratio may be 10 to 100 (e.g., a laptop computer above a thin sheet bomb or a block of Lead in a cargo container).

Figure 3:
FIG. 3 is a Laminography image of the same subject of FIG. 2 produced by the method of the present invention.

As indicated, the maximum reading of $I_i$ corresponds to the minimum total density of material traversed by the corresponding ray. Using the maximum intensity $I_{max}$ as a basis, a parameter P>1 is applied so as to include in the summation only those locations $x_i$, the distances along the x-ray source line 12, that correspond to values of $I_i$ that are greater than or equal to $I_{max}/P$. A preferred value for the parameter P is in the range of about 1.01 to 2. In FIG. 3, an image of the object of FIG. 2 using the method the present invention, the parameter P=1.02. A consequence of the application of the parameter P is that the majority of rays that traverse the focused pixel may be discarded because they contribute only blurring to the image. If the object to be inspected is a person, or perhaps checked luggage containing mainly clothing and plastic, the parameter can be as low as 1.01. The parameter P is chosen appropriately to maximize the quality of the image by a judicious compromise between eliminating the dense material from the unfocused planes and retaining enough material in the calculation to achieve adequate statistics. The parameter can be chosen by the operator of the x-ray imaging system in nearly real time to optimize the image for the particular region of interest.

After application of the parameter P to the values $I_i$, the values that are not eliminated, that is the values where $I_{max}/P < I_i < I_{max}$, are included in the summation of the included rays $\Sigma_{inc}$ of the standard laminography algorithm. The number of samples included is denoted by $i_{inc}$. The summation of these rays $\Sigma_{inc}$, is then multiplied by $i_t/i_{inc}$, where it is the total number of samples including the eliminated samples, in order to compensate for the omission of the intensity of the deleted rays and to normalize the result for all pixels in the image. Thus, the final result for the Laminography intensity as defined in the present invention $I_{lam}$ of each pixel is $I_{lam} = \Sigma_{inc} * i_t/i_{inc}$.

The present invention can also be used to reconstruct lines (and subsequently planes as the source moves relative to the object) that are perpendicular to the x-ray source line 12.

While CT images are superior in density discrimination than Laminography images, including those produced by the method of the present invention, the present method has several advantages over existing CT systems.

The system only requires one straight line x-ray source, which substantially reduces the cost, size, and complexity of the system. The spatial resolution of the Laminography system can always be better than a competing CT system because the CT reconstruction algorithm requires much greater computer cost and complexity than does a Laminography system of the same spatial resolution.

The spatial resolution may be made extremely fine without adding significant complexity to the hardware. There is only a requirement that the beam be sampled more often and that more and smaller detectors be added. In addition, as new detector arrays are developed, including two-dimensional arrays, they may simply be added to the system.

The Laminography system is 10 to 100 times faster than conventional CT with a mechanically rotated x-ray tube in its ability to collect the data required for image formation. The time to acquire a complete line of data is determined by the time to move the x-ray fan beam across the object electronically, preferably 10 msec. This is sufficiently fast to "stop" the heart, for example. Subsequent sweeps of the x-ray beam may distort the image slightly, but the image remains sharp, analogous to a focal plane shutter in photography. Thus, even if it takes some time to make the entire Laminography image, the system is able to perform fast imaging such as "stopping" a moving target, including a beating heart. This fast feature has many other commercial and scientific applications. There is prior art that moves the electron beam around the object being inspected for CT applications, with the electron beam cathode situated at the apex of a cone that blocks the tunnel and therefore makes it impossible to move objects through the system. The new invention has the advantage of using only one straight line on which the x-ray source is produced. Thus the new system does not interfere with objects moving through the tunnel.

More rows that are parallel to the first row of detectors can be added to the primary U-shaped or L-shaped detector array. These rows may be used to increase the flux to the object or patient. And they may be used to blur in the transverse direction as previously discussed. These additional rows can be added without compromising the quality of the Laminography image by using the correct algorithm for each row.

Thus it has been shown and described a method for preventing higher density regions of an object from degrading the lower density focused regions of a Laminography image which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

I claim:

1. A method for substantially reducing the contribution of dense regions of an object while less dense regions of said object are being processed in a laminography blurring system, said method comprising the steps of:

(a) positioning an x-ray source with a moving fan beam on one side of said object;

(b) positioning a row of x-ray detectors on the side of said object opposite that of said x-ray source;

(c) sequentially emitting a plurality of x-ray fan beams along an x-ray source line and directed through a focused pixel of said object to said row of x-ray detectors;

(d) sampling said x-ray detectors once for each of said plurality of fan beams for a total of it samples of intensity $I_i$;

(e) determining the maximum intensity $I_{max}$ from said samples $I_i$;

(f) choosing a parameter P greater than one;

(g) retaining only those of said samples $I_i$ that are greater than or equal to $I_{max}/P$, the number of said retained samples being $i_{inc}$;

(h) summing said retained samples; and (i) normalizing the resultant sum.

2. The method of claim 1 wherein said normalizing includes multiplying said sum by $i_t/i_{inc}$.

3. The method of claim 1 wherein said x-ray source line is parallel to said row of x-ray detectors.

* * * * *